(12) United States Patent
Aigner et al.

(10) Patent No.: US 6,654,450 B1
(45) Date of Patent: Nov. 25, 2003

(54) SPEECH DETECTION DEVICE FOR DETECTING A SPEECH SIGNAL IN AN INPUT SIGNAL

(75) Inventors: Othmar Aigner, Mödling (AT); Christian Fleischer, Vienna (AT)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/534,214

(22) Filed: Mar. 24, 2000

(30) Foreign Application Priority Data

Mar. 25, 1999 (EP) ............................................ 99890105

(51) Int. Cl.⁷ ............................................ H04M 11/00
(52) U.S. Cl. ................................ 379/100.16; 379/93.09
(58) Field of Search ..................... 379/100.16, 100.15, 379/100.06, 100.01, 93.09, 93.11, 386

(56) References Cited

U.S. PATENT DOCUMENTS

| | | | |
|---|---|---|---|
| 5,321,745 A | | 6/1994 | Drory et al. ................ 379/351 |
| 5,349,634 A | * | 9/1994 | Shimomura ............. 379/100.16 |
| 5,442,463 A | * | 8/1995 | Ohnishi .................. 379/100.16 |
| 5,452,342 A | * | 9/1995 | Hashimoto .............. 379/100.16 |
| 5,594,783 A | * | 1/1997 | Ito .......................... 379/100.16 |
| 5,974,123 A | * | 10/1999 | Nakayama et al. ..... 379/100.16 |
| 6,005,924 A | * | 12/1999 | Krexner et al. ......... 379/100.16 |

* cited by examiner

Primary Examiner—Stella Woo
(74) Attorney, Agent, or Firm—Quarles & Brady LLP

(57) ABSTRACT

In a speech detection device (13) for detecting a speech signal (SS) in an input signal (ES), including input means (14) arranged to receive an input signal (ES) which can contain a speech signal (SS) and/or a tone signal (CNG, BSY), and including processing means (15) for processing the input signal (ES) and for supplying at least first and second characteristic information (FS1, FS2, FS3, FS4) of the input signal (ES), and including threshold test means (16) for checking whether the first and the second characteristic information (FS1, FS2, FS3, FS4) exceed a threshold value and for supplying at least one item of detection information (D1, D2, D3, D4), and including evaluation means (17) for evaluating the at least one item of detection information (D1, D2, D3, D4) and for supplying speech detection information (SDI) which is characteristic of the presence of a speech signal (SS) in the input signal (ES), the processing means (15) further include filter means (22) adapted to extract a first frequency band signal (FS1) from a first frequency band (FB1) of the input signal (ES) as first characteristic information and to extract a second frequency band signal (FS2) from a second frequency band (FB2) of the input signal (ES) as second characteristic information, the first frequency band (FB1) and the second frequency band (FB2) not overlapping one another, and the threshold test means (16) are adapted to supply first detection information (D1) when the first frequency band signal (FS1) exceeds a first amplitude threshold value (SW), and to supply second detection information (D2) when the second frequency band signal (FS2) exceeds a second amplitude threshold value (SW), and the evaluation means (17) are adapted to supply speech detection information (SDI) when the first detection information (D1(PZ)) and the second detection information (D2(PZ)) within a test time interval PZ appear at least for a threshold time interval (SZ).

7 Claims, 3 Drawing Sheets

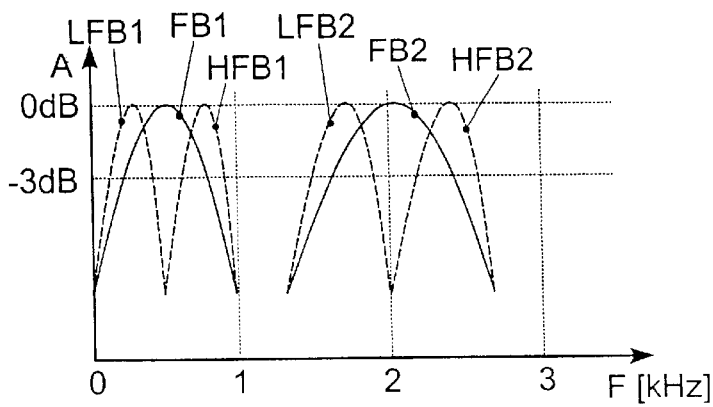
FIG.2
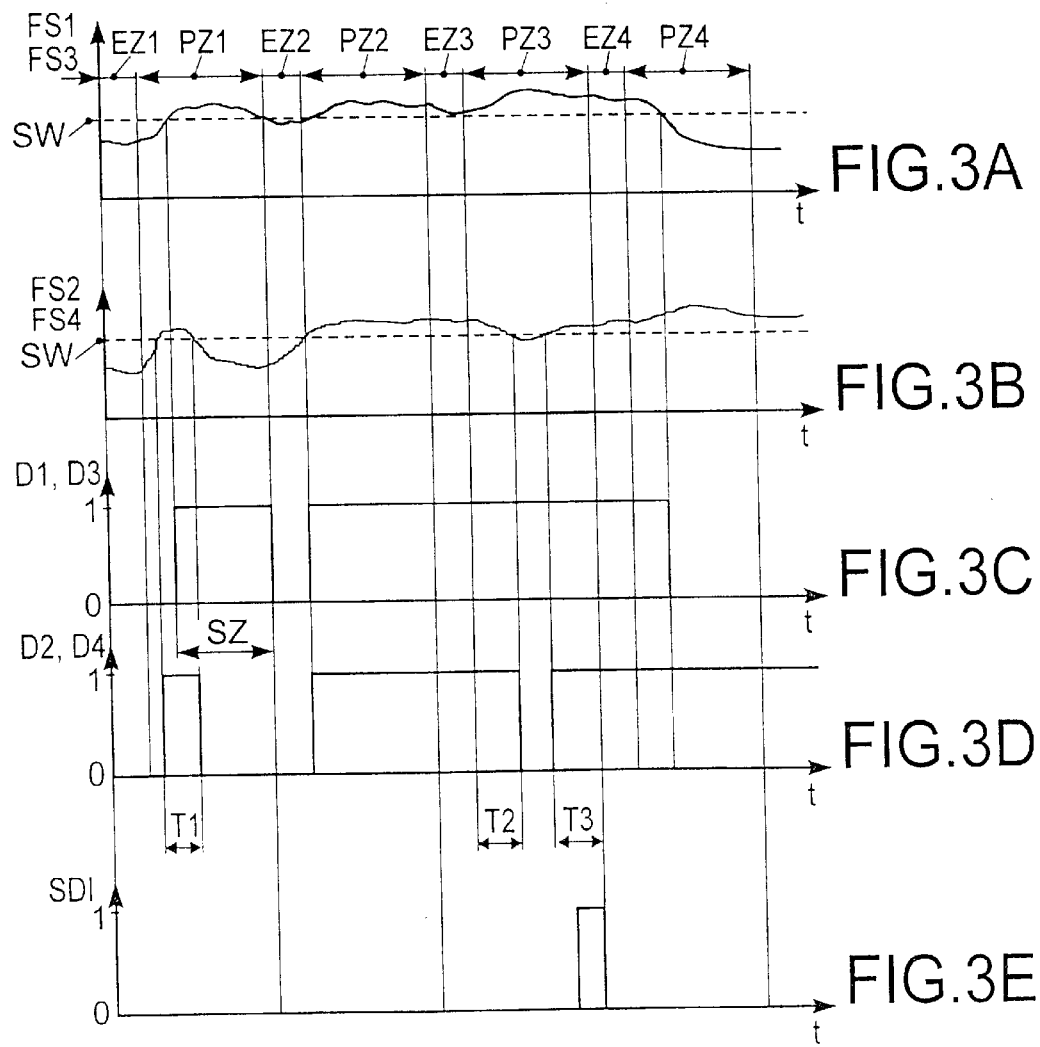
FIG.3A
FIG.3B
FIG.3C
FIG.3D
FIG.3E

| PZ | FK1(PZ) | FK2(PZ) | D1(PZ) | D2(PZ) | D3(PZ) | D4(PZ) | SDI |
|---|---|---|---|---|---|---|---|
| 1 | FB1 | FB2 | 1 | 0 | - | - | 0 |
| 2 | LFB1 | HFB1 | - | - | 1 | 1 | 0 |
| 3 | LFB1 | HFB1 | - | - | 1 | 1 | 1 |
| 4 | LFB1 | HFB1 | - | - | 0 | 1 | 0 |
| 5 | FB1 | FB2 | 0 | 1 | - | - | 0 |
| 6 | LFB2 | HFB2 | - | - | 0 | 1 | 0 |
| 7 | FB1 | FB2 | 0 | 1 | - | - | 0 |
| 8 | LFB2 | HFB2 | - | - | 1 | 1 | 0 |
| 9 | LFB2 | HFB2 | - | - | 1 | 1 | 1 |
| 10 | LFB2 | HFB2 | - | - | 1 | 1 | 1 |
| 11 | LFB2 | HFB2 | - | - | 1 | 1 | 1 |

SPEECH DETECTION DEVICE FOR DETECTING A SPEECH SIGNAL IN AN INPUT SIGNAL

BACKGROUND OF THE INVENTION

A speech detection device is known from the document U.S. Pat. No. 5,321,745 and takes the form of a telephone system. The known telephone system is connected to the public telephone network and is adapted to receive an input signal containing tone signals and/or speech signals.

The telephone system includes a tone detection device adapted to detect a tone signal in an input signal containing signaling tones. A signaling tone can be formed, for example, by a CNG tone (calling tone) having a frequency of 1.1 kHz and characterizing an incoming fax signal in the input signal. When the tone detection device detects a CNG tone the input signal is transferred to fax means of the telephone system.

When a received signal contains a speech signal which at given instants also contains frequency components having a frequency of 1.1 kHz, the speech detection means can erroneously detect a CNG tone, upon which a speech signal is transferred to the fax means. In order to preclude an erroneous detection of a signaling tone in a received signal the known telephone system includes a speech detection device.

The speech detection device has processing means which perform a fast Fourier transform upon an input signal and which check the frequency domain of the input signal. For this purpose, the processing means determine the three largest amplitudes $M_1$, $M_2$ and $M_3$ of the transformed input signal and the frequencies $f_1(M_1)$, $f_2(M_2)$ and $f_3(M_3)$ at which these amplitude values occur.

Threshold value test means of the speech detection device check whether the frequencies $f_1(M_1)$ and $f_2(M_2)$ are higher than the frequency threshold value of 300 Hz and whether $M_1/M_3$ is greater than a coefficient threshold value. The threshold value test means supply detection information corresponding to the results of the tests.

Evaluation means of the speech detection means evaluate the detection information and, when necessary, they supply speech detection information which characterizes the presence of a speech signal in the input signal. When speech detection information is present the input signal is not transferred to the fax means of the telephone system, even when the tone detection means have detected a CNG tone.

The known speech detection device has the drawback that a very high computing power is required in order to carry out a fast Fourier transform, for which reason the known speech detection device requires the use of an IBM compatible computer having a 386 processor.

SUMMARY OF THE INVENTION

It is an object of the invention to provide a speech detection device which can be incorporated in a telephone, a fax apparatus or a telephone answering, device, in which a substantially lower computing; power is available than in a 386 processor. This has the advantage that an input signal can be monitored in the time domain and no fast Fourier transform is required by testing with the aid of the threshold value test means whether two frequency band signals contained in two frequency ranges of the input signal exceed an amplitude threshold value during a threshold time interval, it is determined whether the energy content of the input signal in these two frequency ranges exceeds an energy threshold value during a test time interval which contains the threshold time intervals. If this is the case, the evaluation means detect a speech signal in the input signal because signaling tones do not have any significant energy content in the two frequency ranges.

The invention provides the advantage that a reliable detection is also possible in the case of different types of speech signals contained in an input signal. A reliable detection is then also possible in the case of a speech signal from a speaker having a very low or a very high voice, which speech signal only has a significant energy content in the first and in the second frequency range, respectively.

The invention provides the advantage that both information from subfrequency bands and information from the first and the second frequency band is available to the evaluation means in order to determine whether a speech signal is detected, which enables allowance to be made for the overall energy distribution of the input signal.

The invention provides the advantage that information from at least two test time intervals is available to the evaluation means in order to determine whether the input signal contains a speech signal.

The invention provides the advantage that the filter means of a speech detection device are formed by only one digital filter whose filter coefficients are changed two times during a test time interval in order to obtain information from two frequency ranges of the input signal. This results in a speech detection device having low cost filter means.

The invention provides a communication device including telephone means and fax means, having a particularly reliable fax switch.

The invention provides a telephone answering device which terminates the storage of a speech signal contained in the input signal in a particularly reliable manner.

The invention will now be described in more detail with reference to three examples of use of an embodiment shown in the Figures and given by way of example, to which the invention is not limited.

BRIEF DESCRIPTION OF THE DRAWINGS

FIG. 2 shows a filter curve of a first and a second filter of the speech detection device shown in FIG. 1, by means of which frequency bands of the input signal can be filtered.

FIG. 3 shows signal waveforms of frequency band signals which can be supplied by the first and the second filter and detection information which can be supplied by threshold value test means of the speech detection device, as well as speech detection information which can be supplied by evaluation means of the speech detection device.

DETAILED DESCRIPTION

Figure 1:
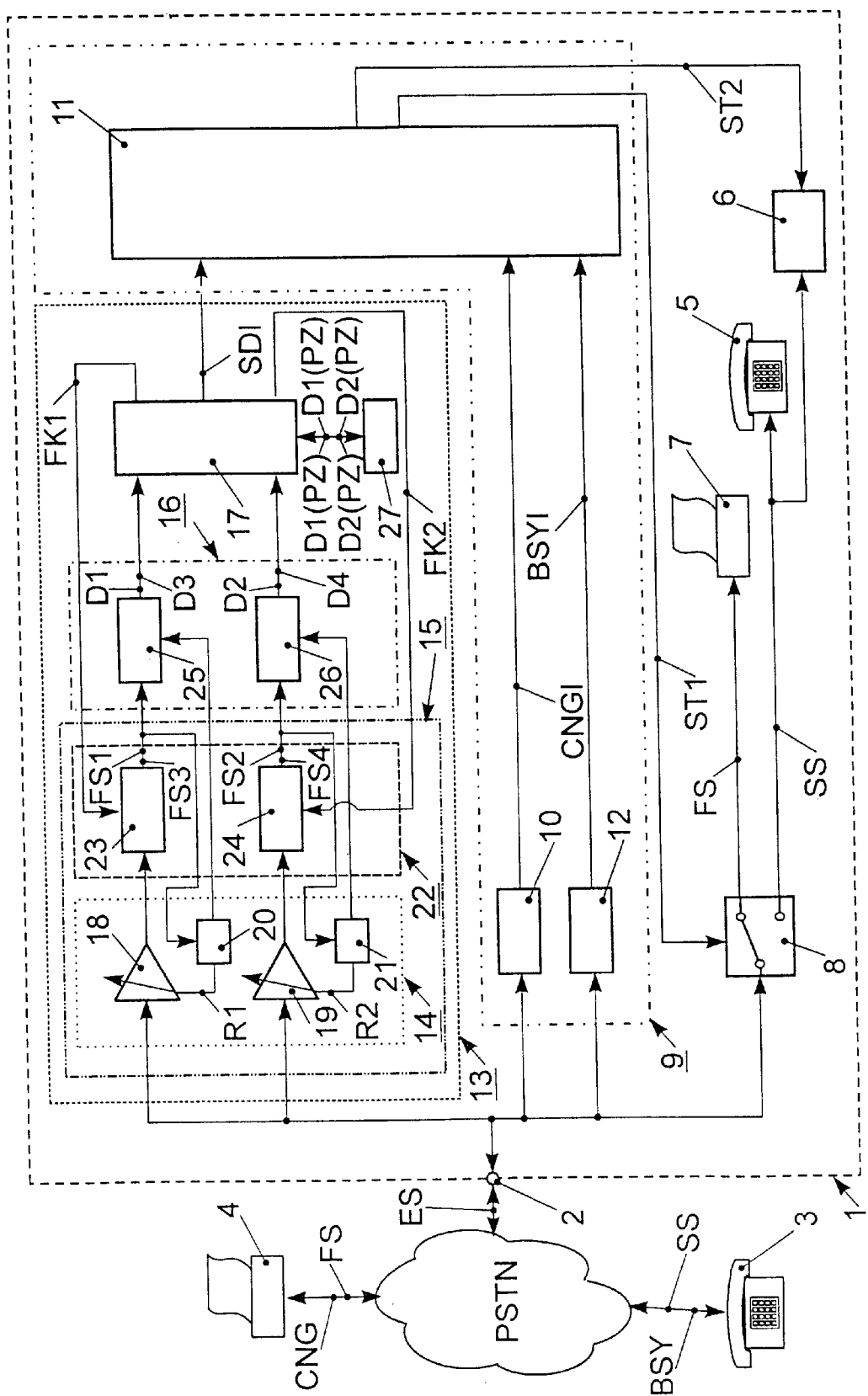
FIG. 1 is a block diagram which diagrammatically shows a communication device including telephone means, fax means and telephone answering means, whose input signal is controlled by a tone detection device provided in the communication device and a speech detection device provided in the communication device.

FIG. 1 is a block diagram which diagrammatically shows a communication device 1 having connection means 2 for connecting the communication device 1 to the public telephone network PSTN. The communication device 1 combines the functions of a telephone, a fax apparatus and a telephone answering device.

Furthermore, a telephone 3 is connected to the public telephone network PSTN. In order to establish and terminate a telephone connection with the communication device 1 the telephone 3 can supply signaling tones to and receive such tones from the telephone network PSTN. Such a signaling tone is for example a BUSY tone signal BSY, which characterizes a termination of a telephone connection by the communication device 1 or the telephone 3 and which has a frequency of 425 Hz. When there is a telephone connection the telephone 3 can receive speech signals SS and supply such signals to the telephone network PSTN.

Moreover, a fax apparatus 4 is connected to the telephone network PSTN. In order to establish and terminate a telephone connection the fax apparatus 4 can supply signaling tones to and receive such tones from the telephone network PSTN. Such a signaling tone is for example a CNG tone signal CNG, which announces the subsequent reception of a fax signal FS to the fax apparatus 4 and which has a frequency of 1,100 Hz. A fax signal FS to be received by the fax apparatus 4 contains a fax message, which can be printed onto a sheet of paper by the fax apparatus 4. The telephone network PSTN can supply an input signal ES to the connection means 2 of the communication device 1, which input signal may contain inter alia a speech signal SS, a fax signal FS, a CNG tone signal CNG or a BUSY tone signal BSY.

The communication device 1 includes telephone means 5 for processing a speech signal SS contained in the input signal ES. A processed speech signal SS can be applied to a loudspeaker of the telephone means 5. A microphone of the telephone means 5 is adapted to pick up a speech signal SS.

The communication device 1 further includes memory means 6 which are adapted to store a speech signal SS contained in the input signal ES in a call-answering mode of the communication device 1. In the present case, the memory means 6 are formed by an EEPROM. Stored speech signals SS can be read from the memory means 6 at a later instant and can be reproduced for a user, as is common practice with telephone answering devices.

The communication device 1 further includes fax means 7 for processing a fax signal FS contained in the input signal ES and for printing out a fax message.

The communication device 1 further comprises a fax switch 8 which forms transfer means. The fax switch 8 is adapted to transfer an input signal ES from the connection means 2 to the fax means 7 when first control information ST1 appears and to transfer the input signal ES from the connection means 2 to the telephone means 5 and the memory means 6 in the absence of the first control information ST1. By means of the fax switch 8 a speech signal SS, supplied from the telephone 3 to the communication device 1 via the telephone network PSTN, is applied to the telephone means 7 and, when the communication device 1 is in the telephone answering mode, to the memory means 6. The fax switch 8 further transfers a fax signal FS, supplied to the communication device 1 via the telephone network PSTN, to the fax means 7.

The communication device 1 further includes a tone signal detection device 9 arranged to receive an input signal ES applied to the connection means 2. The tone signal detection device 9 is adapted to detect a CNG tone signal CNG in the input signal ES and, in response thereto, to supply the first control information ST1 to the fax switch 8. For this purpose, the tone signal detection device 9 includes a first tone signal detector 10 adapted to detect a CNG tone signal CNG in an input signal ES. The tone signal detection device 9 further comprises control means 11 arranged to receive speech detection information SDI, which will be described in further detail hereinafter.

When the first tone signal detector 10 has detected a CNG tone signal CNG in the input signal ES the first tone signal detector 10 can supply CNG information CNGI to the control means 11. The control means 11 are adapted to supply the first control information ST1 to the fax switch 8 when CNG information CNGI appears, allowance being made for speech detection information SDI applied to it. As a result of this, a fax signal FS applied to the communication device 1 as an input signal ES and identified by a CNG tone signal CNG is applied from the fax switch 8 to the fax means 7.

The tone signal detection device 9 is further adapted to detect a BUSY tone signal BSY in an input signal ES and, in response thereto, to supply second control information ST2 to the memory means 6. For this purpose, the tone signal detection device 9 includes a second tone signal detector 12 arranged to receive an input signal ES from the connection means 2.

When the second tone signal detector 12 detects a BUSY tone signal BSY in the input signal ES the second tone signal detector 12 can supply BUSY information BSYI to the control means 11. The control means 11 are adapted to supply the second control information ST2 to the memory means 6 when BUSY information BSYI appears, allowance being made for speech detection information SDI applied to it. The memory means 6 are adapted to terminate the storage of a speech signal SS applied to the memory means 6, when second control information ST2 occurs.

When the communication device 1 is in the telephone answering mode a BUSY tone signal BSY is detected so as to detect that the user of the telephone 3 has placed the receiver on the hook, in order to subsequently terminate the storage of the speech signal SS previously received from the telephone 3.

The communication device 1 also includes a speech detection device 13 adapted to detect a speech signal SS in an input signal ES. For this purpose, the speech detection device 13 includes input means 14, processing means 15, threshold value test means 16 and evaluation means 17.

The input means 14 include a first amplifier 18, a second amplifier 19, a first control stage 20 and a second control stage 21. An input signal ES supplied to the connection means 2 can be applied to the first amplifier 18 and the second amplifier 19. An input signal processed by the processing means 15 and supplied by the first amplifier 18 can be applied to the first control stage 20 and an input signal processed by the processing means 15 and supplied by the second amplifier 19 can be applied to the second control stage 21. The first control stage 20 can supply first control information R1 to the first amplifier 18 and the second control stage 21 can supply second control information R2 to the second amplifier 19 in order to maintain the amplified input signal ES supplied by the first amplifier 18 and the second amplifier 19 at a given level. Such a control of an amplifier having a feedback control stage is commonly known as an automatic gain control.

The processing means 15 of the speech detection device 13 are adapted to process an amplified input signal ES supplied by the input means 14 and to supply at least first and second characteristic information of the input signal ES. For this purpose, the processing means 15 further include filter means 22 adapted to extract a first frequency band signal FS1 from a first frequency band FBI of the input signal ES as first characteristic information and to extract a second frequency band signal FS2 from a second frequency band FB2 of the input signal ES as second characteristic information.

For filtering the input signal ES amplified by the input means 14 the filter means 22 comprise a first digital filter 23 and a second digital filter 24. The first digital filter 23 is arranged to receive first filter coefficient information FK1 from the evaluation means 17 and the second digital filter 24 is adapted to receive second filter coefficient information FK2 from the evaluation means 17.

When filter coefficient information FK is applied to the digital filter 23 or 24 the digital filter 23 or 24 is adapted to modify its filter curve and, after expiry of a settling time interval EZ, which can be for example 10 milliseconds, to extract the frequency band signal FS containing the filter coefficient information FK from the input signal ES.

This has the advantage that both the first digital filter 23 and the second digital filter 24 can successively filter a plurality of frequency bands of the input signal ES in order to derive frequency band signals FS from the filtered frequency bands as characteristic information. Thus, additional filter which are otherwise necessary can be dispensed with and thereby enable a low-cost production of the speech detection device 13.

FIG. 2 shows filter curves of the first digital filter 23 and the second digital filter 24, which can be adapted by changing the filter coefficients of the digital filters. Three different values of filter coefficient information FK1 can be applied to the first digital filter 23 in order to extract the first frequency band FB1, a low frequency band LFB1 of the first frequency band FB1 and a low frequency band LFB2 of the second frequency band FB2 from the input signal ES. The low frequency band LFB1 of the first frequency band FB1 then has a filter curve of 300 Hz+/−150 Hz. The low frequency band LFB2 of the second frequency band FB2 has a filter curve of 1600 Hz+/−250 Hz.

When the first frequency band FB1 is extracted from the input signal ES by means of the first digital filter 23 the first digital filter 23 can supply a first frequency band signal FS1 and when a low frequency band LFB is extracted from the input signal ES the first digital filter 23 can supply a third frequency band signal FS3. FIG. 3A represents the frequency band signal FS supplied by the first digital filter 23 as a function of time, which signal contains a first frequency band signal FS1 during a test time interval PZ1 and a third frequency band signal FS3 during test time intervals PZ2, PZ3 and PZ4.

Three different values of second filter coefficient information FK2 can be applied to the second digital filter 24 in order to extract the second frequency band FB2, a high frequency band HFB1 of the first frequency band FB1 and a high frequency band HFB2 of the second frequency band FB2 from the input signal ES. The high frequency band HFB1 of the first frequency band FB1 then has a filter curve of 700 Hz+/−200 Hz and the high frequency band HFB2 of the second frequency band FB2 has a filter curve of 2500 Hz+/−300 Hz.

When the second frequency band FB2 is extracted from the input signal ES by means of the second digital filter 24 the second digital filter 24 can supply a second frequency band signal FS2 and when a high frequency band HFB is extracted from the input signal ES the second digital filter 24 can supply a fourth frequency band signal FS4. FIG. 3B represents the frequency band signal FS supplied by the second digital filter 24 as a function of time, which signal contains a second frequency band signal FS2 during the test time interval PZ1 and a fourth frequency band signal FS4 during the test time intervals PZ2, PZ3 and PZ4.

The first frequency band FB1 contains the low frequency band LFB1 and the high frequency band HFB1 of the first frequency band FB1 and the second frequency band FB2 contains the low frequency band LFB2 and the high frequency band HFB2 of the second frequency band FB2. It is to be noted that the first frequency band FB1 and the second frequency band FB2 do not overlap one another, as will be expounded hereinafter.

The frequency bands are defined in such a manner that tone signals to be expected in an input signal ES do not contain any significant energy components in the filtered frequency band signals. As a matter of fact, a tone signal to be expected should not comprise any significant energy components in two frequency band signals of adjacent frequency bands. It is to be noted that the frequencies specified for the filter curves have been given merely by way of example and a multitude of further possible filter curves are known to the expert.

The threshold value test means 16 of the speech detection device 13 are adapted to supply first detection information D1 when the first frequency band signal FS1 exceeds an amplitude threshold value SW shown in FIG. 3A, and to supply second detection information D2 when the second frequency band signal FS2 exceeds an amplitude threshold value SW shown in FIG. 3B. The threshold value test means 16 of the speech detection device 13 are further adapted to supply third detection information D3 when the third frequency band signal FS3 exceeds the amplitude threshold value SW shown in FIG. 3A, and to supply fourth detection information D4 when the fourth frequency band signal FS4 exceeds the amplitude threshold value SW shown in FIG. 3B.

For this purpose, the threshold value test means 16 include a first threshold value detector 25 and a second threshold value detector 26. The first threshold value detector 25 is arranged to receive the first frequency band signal FS1 and the third frequency band signal FS3 from the first digital filter 23 and the first threshold value detector 25 is adapted to supply the first detection information D1 and the third detection information D3 to the evaluation means 17. The second threshold value detector 26 is arranged to receive the second frequency band signal FS2 and the fourth frequency band signal FS4 from the second digital filter 24 and the second threshold value detector 26 is adapted to supply the second detection information D2 and the fourth detection information D4 to the evaluation means 17.

First gain information can be applied from the first control stage 20 to the threshold value detector 25 and second gain information can be applied from the second control stage 21 to the second threshold value detector 26, which information relates to the gain factor by which the input signal ES has been amplified. The threshold value detectors 25 and 26 are adapted to define the amplitude threshold value SW by evaluation of the gain information.

FIG. 3 represents the variation as a function of time of the detection information supplied by the first threshold value detector 25, which detection information during the test time interval PZ1 contains the first detection information D1 derived from the first frequency band signal FS1 and during the test time intervals PZ2, PZ3 and PZ4 contains third detection information D3 derived from the third frequency band signal FS FS3.

FIG. 3D shows the variation as a function of time of detection information supplied by the second threshold value detector 26, which detection information contains during the test time interval PZ1 second detection information D2 derived from the second frequency band signal FS2 and during the test time intervals PZ2, PZ3 and PZ4 contains fourth detection information D4 derived from the fourth frequency band signal FS4. The detection information D1, D2, D3 or D4 has a value "1" when the frequency band signal FS from which the detection information has been derived exceeds the amplitude threshold value SW and, conversely, has a value "0" when the corresponding frequency band signal FS does not exceed the amplitude threshold value SW.

It is to be noted that a speech signal SS is generally characterized in that it exhibits a comparatively wide frequency spectrum at least two of the frequency bands shown in FIG. 2 contain significant energy components of a speech signal SS. Conversely, tone signals are characterized in that their basic energy content occurs at a given frequency and adjacent frequency bands exhibit hardly any energy components of a tone signal.

The evaluation means 17 are now adapted to supply speech detection information SD1, shown in FIG. 3E, to the control means 11 when the first detection information D1(PZ) and the second detection information D2(PZ) within a test time interval PZ appear at least for a threshold time interval SZ, i.e. have the value "1". To this end, the evaluation means 17 are adapted to define test time intervals PZ of 40 milliseconds. This value is advantageous because energy components of a speech signal SS generally remain quasi-stationary for approximately 40 to 100 milliseconds and shorter test time intervals PZ would merely require more computing power for the evaluation means 17.

Furthermore, a threshold time interval SZ of 70% of the time of a test time interval PZ—i.e. of 28 milliseconds—is defined in the evaluation means 17. The evaluation means 17 now check whether the detection information supplied by both threshold value detectors 25 and 26 within a test time interval PZ have the value "1" for at least the threshold time interval SZ. When this requirement is met it is highly probable that the input signal ES contains a speech signal SS, upon which the evaluation means 17 supply speech detection information SDI to the control means 11. When speech detection information SDI appears the control means 11 are adapted to inhibit a change of the first control information ST1 last applied to the fax switch 8, even when at the same time CNG information CNGI is applied to the control means 11. When the communication device 1 is in the telephone answering mode the control means 11 are adapted not to supply second control information ST2 to the memory means 6 when speech detection information SDI and BUSY information BSYI appear at the same time.

This has the advantage that also when the tone detection device 9 detects a tone signal, for example because a tone signal is superposed on a speech signal SS or because a speech signal SS contains a frequency component similar to the tone signal, switching over of the fax switch 8 by the control means 11 or a premature termination of the storage of a speech signal SS by the memory means 6 is prevented. This precludes an interruption of a telephone conversation, which is very advantageous.

Moreover, the advantage is obtained that energy contents of different frequency bands of the input signal ES are tested in the time domain, as a result of which the speech detection device 13 requires only a limited computing power.

The speech detection device 13 further includes history memory means 27 adapted to store at least detection information D(PZ1) supplied by the threshold value detection means 16 after a first test time interval PZ1. This yields the advantage that the evaluation means 17 have access to characteristic information of the input signal ES from a plurality of test time intervals PZ.

The evaluation means 17 are further adapted to evaluate at least the detection information D(PZ2) of the first test time interval PZ1 and the detection information D(PZ2) of a second test time interval PZ2 after the second test time interval PZ2 which follows the first test time interval PZ1. The evaluation means 17 then check whether in at least two successive test time intervals PZ the requirement is met that both detection information values were "1" and they supply the value "1" as speech detection information SDI when this requirement is met, for example, for two or more successive test time intervals PZ.

This has the advantage that brief spurious components in the input signal ES do not give rise to erroneous detection of a speech signal SS in the input signal ES. The reliability of the speech detection device 13 has improved substantially by the provision of history memory means 27 and by the fact that stored detection information D(PZ) is taken into account by the evaluation means 17.

When only the first detection information D1(PZ) or only the second detection information D2(PZ) occurs within a test time interval PZ the threshold value test means 16 are now adapted to supply third detection information D3 when a third frequency band signal FS3 extracted, respectively, from the low frequency band LFB1 of the first frequency band FB1 or from the low frequency band LFB2 of the input signal ES by the filter means 22 exceeds the amplitude threshold value SW. Moreover, when only the first detection information D1(PZ) or only the second detection information D2(PZ) occurs within a test time interval the threshold value test means 16 are adapted to supply fourth detection information D4 when a fourth frequency band signal FS4 extracted, respectively, from the high frequency band HFB1 of the first frequency band FB1 or from the high frequency band HFB2 of the input signal by the filter means 22 exceeds the amplitude threshold value SW.

The evaluation means 17 are then adapted to supply the value "1" as speech detection information SDI when the third detection information D3(PZ) and the fourth detection information D4(PZ) exhibit the value "1" within the test time interval PZ for at least the threshold time interval SZ. This will be expounded on hereinafter with reference to an example of the use of the speech detection device 13.

Figure 4:
FIG. 4 shows an evaluation table which can be generated in the evaluation means of the speech detection device.

The operation of the speech detection device 13 of the communication device 1 is explained for an example of use of the speech detection device 13 with the aid of signal waveforms shown in FIG. 3 and an evaluation table 28 shown in FIG. 4. The evaluation table 28 is generated by the evaluation means 17 and is stored in the history memory means 27.

The evaluation table 28 specifies information for successive test time intervals PZ1 to PZ11, given in the first row of the evaluation table 28. A second row of the evaluation table 28 gives first filter coefficient information FK1 (PZ) supplied to the first digital filter 23 for the respective test time interval PZ and a third row of the evaluation table 28 gives filter coefficient information FK2(PZ) supplied to the second digital filter 24 for the respective test time interval PZ. The rows four, five, six and seven of the evaluation table 28 give values of the detection information D(PZ) of the respective test time intervals PZ, derived by the evaluation means 17 from the detection information D supplied by the threshold value test means 16. The eighth row of the evaluation table 28 gives values of the speech detection information SDI supplied to the control means 11 by the evaluation means 17.

As indicated in the evaluation table 28, the first filter coefficient information FK1(PZ1)=FB1 is applied to the first digital filter 23 and the second filter coefficient information FK2(PZ1)=FB2 is applied to the second digital filter 24 during the first test time interval PZ1. Thus, after a settling time interval EZ1 the first frequency band signal FS1 shown in FIG. 3A and the second frequency band signal FS2 shown in FIG. 3B are applied to the threshold value test means 16 during the first test time interval PZ1. Subsequently, the first threshold value detector 25 supplies the first detection information D1 shown in FIG. 3C and the second threshold value detector 26 supplies the second detection information D2 shown in FIG. 3D to the evaluation means 17 during the first test time interval PZ1.

The evaluation means 17 detect that the first detection information D1 has had the value "1" for the threshold time interval SZ within the first test time interval PZ1 and enter the value "1" for the detection information D1(PZ1) of the first test time interval PZ1 into the evaluation table 28. Three evaluation means 17 further detect that the second detection information D2 has had the value "1" during a time interval T1 shorter than the threshold time interval SZ, for which reason the evaluation means 17 enter the value "0" into the evaluation table 28 as second detection information D2(PZ1) of the first test time interval PZ1. Third detection information D3(PZ1) and fourth detection information D4 (PZ1) of the first test time interval PZ1 cannot be determined by the evaluation means 17 because only the first detection information D1 and the second detection information D2 have been applied to the evaluation means 17 during the first test time interval PZ1.

From the values of the detection information D(PZ1) of the first test time interval PZ1 which have been entered into the second row of the evaluation table 28 the evaluation means 17 infer that the input signal ES has significant energy components in the first frequency band FB1 only and not in the second frequency band FB2. Since—as explained hereinbefore—a speech signal SS generally has significant energy components both in the first and in the second frequency band it is highly probable that the input signal ES does not contain a speech signal SS. The evaluation means 17 therefore supply the value "0" as speech detection information SDI to the control means 11 and enter the value "0" into the evaluation table 28.

Since only one of the two detection information values D(PZ1) of the first test time interval PZ1 is "1" the evaluation means 17 supplies corresponding filter coefficient information FK to the filter means 22 after the first test time interval PZ1 in order to perform, in a second test time interval PZ2, a more accurate test upon the frequency band FB1 in which the input signal ES had significant energy components during the first test time interval PZ1. This more accurate test upon the first frequency band FB1 is performed in order to also ensure a reliable detection of a speech signal uttered by a speaker having a low voice, which speech signal SS will have significant energy components exclusively in the low frequency band LFB1 and the high frequency band HFB1 of the first frequency band FB1.

After expiry of a second settling time interval EZ2 a third frequency band signal FS3 shown in FIG. 3A in the second test time interval PZ2 and a fourth frequency band signal FS4 shown in FIG. 3B in the second test time interval PZ2 are supplied to the threshold value test means 16. Third detection information D3 and fourth detection information D4 supplied by the threshold value test means 16 in response thereto have the value "1" during the entire second test time interval PZ2. Consequently, the value "1" is entered into the evaluation table 28 for the third detection information D3(PZ2) and the fourth detection information D4(PZ2) of the second test time interval PZ2.

From the values of the detection information D(PZ1) of the first test time interval PZ1 entered in the second row of the evaluation table 28 and the values of the detection information D(PZ2) of the second test time interval PZ2 of the second test time interval PZ2 entered in the third row of the evaluation table 28 the evaluation means 17 infer that the input signal ES exhibits significant energy components in at least two frequency bands for a short time only. In order to preclude an erroneous detection of a speech signal SS as a result of a spurious component of the input signal ES the evaluation means 17 supply the value "0" to the control means 11 as speech detection information SDI and load this value into the evaluation table 28.

Since both detection information values D(PZ2) are "1" during the second test time interval PZ2 the evaluation means 17 do not alter the first and the second filter coefficient information FK in order to test the energy contents of the input signal ES in the low frequency band LFB1 and the high frequency band HFB1 of the first frequency band FB1 also in a third test time interval PZ3.

Third detection information D3, supplied by the threshold value test means 16 during the third test time interval PZ3 after a third settling time interval EZ3, has the value "1" and fourth detection information D4 has the value "1" during a time interval T2 and a time interval T3. Since the sum of the time intervals T2 and T3 exceeds the threshold time interval SZ the evaluation means 17 load the value "1" for the detection information D3(PZ3) and D4(PZ3) into the evaluation table 28 for the third test time interval PZ3.

From the values of the detection information D(PZ2) of the second test time interval PZ2 entered into third row of the evaluation table 28 and the values of the detection information D(PZ3) of the third test time interval PZ3 entered into the fourth row of the evaluation table 28 the evaluation means 17 infer that the input signal ES now has significant energy components in at least two frequency bands for a longer time. The evaluation means 17 consequently supply the value "1" as speech detection information SDI to the control means 11 and load this value into the evaluation table 28.

Since the evaluation means 17 have entered the value "1" into the evaluation table 28 for both detection information values D3(PZ3) and D4(PZ4) of the third test time interval PZ3 the evaluation means 17 do not alter the filter coefficient information FK in order to test the energy contents of the input signal ES in the low frequency band LFB1 and the high frequency band HFB1 of the first frequency band FB1 also in a fourth test time interval PZ4. The evaluation means 17 subsequently only detect significant energy components of the input signal ES in the high frequency band HFB1, for which reason the evaluation means 17 supply the value "0" as speech detection information SDI for the fourth test time interval PZ4 to the control means 11.

Since only one of the two detection information values D(PZ4) of the fourth test time interval PZ4 is "1" the evaluation means 17 supply corresponding filter coefficient information FK to the filter means 22 after the fourth test time interval PZ4, in order to check energy contents of the first frequency band FB1 and of the second frequency band FB2 of the input signal ES during a fifth test time interval PZ5. The evaluation means 17 then detect significant energy components of the input signal ES in the second frequency band FB2, for which reason the filter coefficient information FK is changed for a sixth test time interval PZ6 in order to check the energy contents of the input signal ES in the second frequency band FB2 more closely.

Since the evaluation means 17 detect that in the sixth test time interval PZ6 the input signal ES has significant energy components only in the high frequency band HFB2 of the second frequency band FB2 but not in the low frequency band LFB2 of the second frequency band FB2 the value "0" is supplied to the control means 11 as speech detection information SDI.

In response to this the evaluation means 17 again alter the filter coefficient information FK in order to check energy components of the input signal ES in the first frequency band FB1 and the second frequency band FB2 during a seventh test time interval PZ7. In the seventh test time interval PZ7 the evaluation means 17 only detect significant energy components of the input signal ES in the second frequency band FB2, for which reason the filter coefficient information FK supplied by the evaluation means 17 is changed in order to check energy components of the input signal ES in the second frequency band FB2 more closely in an eighth test time interval PZ8.

In the subsequent eighth, ninth, tenth and eleventh test time intervals PZ significant energy components of the input signal ES are detected both in the low frequency band LFB2 and in the high frequency band HFB2 of the second frequency band FB2, as a result of which the value "1" is supplied to the control means 11 as speech detection information SDI and loaded into the evaluation table 28 starting from the ninth test time interval PZ9.

This yields the advantage that the speech detection device 13 supplies up-to-date speech detection information SDI (PZ) to the control means 11 after each test time interval PZ, as a result of which switching over of the fax switch 8 or termination of the storage by the memory means 6 is effected in a particularly reliable manner. Owing to the simple and low-cost construction of the speech detection device 13 this device can be integrated in any telephone, fax apparatus or telephone answering device.

In a first example of the use of the communication device 1 the communication device 1 is called by the telephone 3. After a telephone connection with the telephone means 5 has been established by the telephone 3 via the telephone network PSTN and the fax switch 8 a speech signal SS is transmitted from the telephone 3 to the telephone means 5.

While the user of the telephone 3 speaks into the receiver of the telephone 3 an excavator in front of the user's house produces a tone having a frequency of 1100 Hz. As a result of this, a speech signal SS with a superposed tone signal is supplied to the communication device 1 as an input signal ES. The first tone signal detector 10 then detects a CNG tone signal CNG and supplies CNG information CNGI to the control means 11. At the same time the speech detection device 13 supplies speech detection information SDI to the control means 11.

As a result of this, the control means 11 do not supply first control information SDT1 in the case of a simultaneous appearance of CNG information CNGI and speech detection information SDI when prior to this no first control information ST1 has been supplied, so that advantageously the telephone connection between the telephone 3 and the telephone means 5 is not interrupted.

In a second example of the use of the communication device 1 the communication device 1 is in the telephone answering mode and the communication device 1 is called by the telephone 3. After a telephone connection has been established from the telephone 3 to the memory means 6 via the telephone network PSTN and the fax switch 8 a speech signal SS is transmitted from the telephone 3 to the memory means 6 and is stored by the memory means 6.

While the user of the telephone 3 speaks into the receiver of the telephone 3 a radio in the background produces a tone signal having a significant energy component at 425 Hz. As a consequence, a speech signal SS with a superposed tone signal is supplied to the communication device 1 as an input signal ES. The second tone signal detector 12 subsequently detects a BUSY tone signal BSY and supplies BUSY information BSYI to the control means 11. At the same time, the speech detection device 13 supplies speech detection information SDI to the control means 11.

Advantageously, the control means 11 do not supply second control information ST2 in the case of a simultaneous occurrence of BUSY information BSYI and speech detection information SDI and therefore the telephone connection between the telephone 3 and the memory means 6 is not interrupted prematurely.

It is to be noted that in the field of telecommunication or computer technology a multitude of further tone signals are known. A speech detection device in conjunction with the detection of such tone signals can be used advantageously in numerous fields of application.

It is to be noted that evaluation means may also be adapted to evaluate characteristic information of a large number of test time intervals and, when necessary, to supply speech detection information. This enables the probability of a correct decision to be further improved.

It is to be noted that filter means can simultaneously extract frequency band signal from three, five or even ten frequency ranges for a more accurate detection of the energy components of an input signal.

It is to be noted that for each frequency band signal supplied by the filter means another amplitude threshold value may be defined in order to achieve a more accurate evaluation of the individual frequency bands.

It is to be noted that the filter means may also be formed by only one digital filter whose filter coefficients are variable.

It is to be noted that detection information supplied by a threshold value detector may also be used for further evaluation in the evaluation means in order to achieve an improved monitoring of the long-term behavior. Detection information values may then be multiplied by weighting factors, for example in accordance with a Gaussian distribution.

What is claimed is:

1. A speech detection device for detecting a speech signal in an input signal, including input means arranged to receive an input signal which can contain at least one of a speech signal and a tone signal, and including processing means for processing the input signal and for supplying at least a first and a second characteristic information of the input signal, and including threshold test means for checking whether the first and the second characteristic information exceed a threshold value and for supplying at least one item of detection information, and including evaluation means for evaluating the at least one item of detection information and for supplying speech detection information which is characteristic of the presence of a speech signal in the input signal, wherein the processing means include filter means adapted to extract a first frequency band signal from a first frequency band of the input signal as first characteristic information and to extract a second frequency band signal from a second frequency band of the input signal as second characteristic information, the first frequency band and the second frequency band not overlapping one another, and the threshold test means is adapted to supply first detection information when the first frequency band signal exceeds a first amplitude threshold value, and to supply second detection information when the second frequency band signal exceeds a second amplitude threshold value, when only the first detection information or only the second detection information occurs within a test time interval, the threshold value test means being adapted to supply third detection information when a third frequency band signal extracted, respectively, from a low frequency band of the first frequency band or the second frequency band of the input signal by the filter means exceeds a third amplitude threshold value, and to supply fourth detection information when a fourth frequency band signal extracted, respectively, from a high frequency band of the first frequency band FBI or the second frequency band of the input signal by the filter means exceeds a fourth amplitude threshold value, and the evaluation means are adapted to supply speech detection information when the first detection information and the second detection information within a test time interval appear at least for a threshold time interval and when the third detection information and the fourth detection information appear within the test time interval at least for the threshold time interval, and wherein when only the third detection information or only the fourth detection information appear within a test time interval the threshold test means are adapted to again supply at least one of he first detection information and the second detection information.

2. A communication device including the speech detection device as recited in claim 1, wherein the filter means are formed by at least one digital filter whose filter coefficients are variable.

3. A communication device including the speech detection device as recited in claim 1, further including connection means for connecting the communication device to a telephone network and for receiving an input signal, and including telephone means for processing a speech signal contained in the input signal and including fax means for processing a fax signal contained in the input signal and identified by at least one CNG tone signal contained in the input signal, and including a tone signal detection device for detecting a CNG tone signal in the input signal can be detected and which can include first control information in the case of a positive detection result, and said communication device including transfer means for transferring the input signal from the connection means to the fax means when first control information is present and to transfer the input signal from the connection means to the telephone means in the absence of the first control information, wherein when speech detection information is present, the tone signal detection device inhibits a change of the first control information last applied to the transfer means.

4. A communication device including the speech detection device as recited in claim 1, and further including connection means for connecting the communication device to the telephone network and for receiving an input signal, and including memory means for storing a speech signal contained in the input signal and including a tone signal detection device by means of which a BUSY tone signal in the input signal can be detected and which can supply second control information to the memory means in the case of a positive detection result in order to terminate the storage of the input signal, and wherein when speech detection information is present, the tone signal detection device inhibits a change of first control information last applied to the transfer means.

5. A communication device including the speech detection device as recited in claim 1, and further including connection means for connecting the communication device to the telephone network and for receiving an input signal, and including memory means for storing a speech signal contained in the input signal and including a tone signal detection device by which a BUSY tone signal in the input signal can be detected and which can supply second control information to the memory means in the case of a positive detection result in order to terminate the storage of the input signal, wherein the tone signal detection device cannot supply second control information to the memory means when speech detection information is present.

6. A speech detection device for detecting a speech signal in an input signal, including input means arranged to receive an input signal which can contain at least one of a speech signal and a tone signal, and including processing means for processing the input signal and for supplying at least a first and a second characteristic information of the input signal, and including threshold test means for checking whether the first and the second characteristic information exceed a threshold value and for supplying at least one item of detection information, and including evaluation means for evaluating the at least one item of detection information and for supplying speech detection information which is characteristic of the presence of a speech signal in the input signal, wherein the processing means include filter means adapted to extract a first frequency band signal from a first frequency band of the input signal as first characteristic information and to extract a second frequency band signal from a second frequency band of the input signal as second characteristic information, the first frequency band and the second frequency band not overlapping one another, and the threshold test means is adapted to supply first detection information when the first frequency band signal exceeds a first amplitude threshold value, and to supply second detection information when the second frequency band signal exceeds a second amplitude threshold value, when only the first detection information or only the second detection information occurs within a test time interval, the threshold value test means being adapted to supply third detection information when a third frequency band signal extracted, respectively, from a low frequency band of the first frequency band or the second frequency band of the input signal by the filter means exceeds a third amplitude threshold value, and to supply fourth detection information when a fourth frequency band signal extracted, respectively, from a high frequency band of the first frequency band FBI or the second frequency band of the input signal by the filter means exceeds a fourth amplitude threshold value, and the evaluation means are adapted to supply speech detection information when the first detection information and the second detection information within a test time interval appear at least for a threshold time interval and when the third detection information and the fourth detection information appear within the test time interval at least for the threshold time interval, and wherein there have been provided history memory means adapted to store at least detection information supplied by the threshold value detection means after a first test time interval, and the evaluation means are further adapted to evaluate at least the detection information of the first and of a second test time interval after the second test time interval which follows the first test time interval.

7. A communication device including the speech detection device as recited in claim 6, wherein the filter means are formed by at least one digital filter whose filter coefficients are variable.

* * * * *

UNITED STATES PATENT AND TRADEMARK OFFICE
CERTIFICATE OF CORRECTION

PATENT NO.   : 6,654,450 B1
DATED        : November 25, 2003
INVENTOR(S)  : O. Aigner and C. Fleischer It is certified that error appears in the above-identified patent and that said Letters Patent is hereby corrected as shown below:

Column 3,
Lines 49 and 52, at both instances change "ST1" to -- STI --.

Signed and Sealed this

Thirteenth Day of July, 2004

JON W. DUDAS
*Acting Director of the United States Patent and Trademark Office*